United States Patent
Liron et al.

(10) Patent No.: US 10,122,642 B2
(45) Date of Patent: Nov. 6, 2018

(54) MANAGING A DATA STREAM IN A MULTICORE SYSTEM

(71) Applicant: Intel IP Corporation, Santa Clara, CA (US)

(72) Inventors: Oded Oliron Liron, Ha (IL); Netanel Nati Bar-David, Oranit (IL); Marina Sharkansky, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 112 days.

(21) Appl. No.: 15/280,085

(22) Filed: Sep. 29, 2016

(65) Prior Publication Data

US 2018/0091434 A1 Mar. 29, 2018

(51) Int. Cl.
*H04L 12/801* (2013.01)
*G06F 17/30* (2006.01)
*H04L 12/891* (2013.01)
*H04L 29/08* (2006.01)

(52) U.S. Cl.
CPC ........ *H04L 47/34* (2013.01); *G06F 17/30368* (2013.01); *G06F 17/30516* (2013.01); *H04L 47/193* (2013.01); *H04L 47/41* (2013.01); *H04L 69/326* (2013.01)

(58) Field of Classification Search
CPC ....... H04L 47/34; H04L 47/41; H04L 47/193; H04L 69/326; G06F 17/30368; G06F 17/30516
See application file for complete search history.

(56) References Cited

U.S. PATENT DOCUMENTS

| | | | |
|---|---|---|---|
| 5,968,167 A | 10/1999 | Whittaker et al. | |
| 7,328,270 B1 | 2/2008 | Reents et al. | |
| 7,453,878 B1 * | 11/2008 | Martin | H04L 45/24 370/231 |
| 7,627,688 B1 * | 12/2009 | Artz, Jr. | G06Q 10/063 370/230.1 |
| 7,860,010 B2 * | 12/2010 | Yang | H04L 47/193 370/235 |

(Continued)

OTHER PUBLICATIONS

Search Report dated Oct. 22, 2017 for International Application No. PCT/US17/050253.

*Primary Examiner* — Asad M Nawaz
*Assistant Examiner* — Thomas R Cairns
(74) *Attorney, Agent, or Firm* — Schiff Hardin LLP

(57) ABSTRACT

Techniques are provided for managing the forwarding of a data stream to respective cores of a multi-core system, in which the incoming data stream is processed in a hardware machine prior to forwarding the data stream to respective cores. The techniques may include the hardware machine executing an algorithm to identify frames in the data stream having a fake hole therein, generating metadata, and attaching the metadata to any frame in which a fake hole is identified. The metadata may instruct a core that receives the respective frame in which a fake hole has been identified to ignore the fake hole in that respective frame. Also in the algorithm, the hardware machine identifies frames in which a real hole exists and maintains a database log of the real holes and the respective cores among the multiple cores that receive the data stream with the real holes therein, together with a notification to the respective core.

20 Claims, 3 Drawing Sheets

(56) References Cited

U.S. PATENT DOCUMENTS

| | | | |
|---|---|---|---|
| 8,085,669 B2* | 12/2011 | Hama | H04L 47/10 |
| | | | 370/232 |
| 8,614,970 B2* | 12/2013 | Trainin | G01V 1/303 |
| | | | 370/230 |
| 9,119,109 B1* | 8/2015 | Dubrovsky | H04W 28/16 |
| 2007/0180310 A1 | 8/2007 | Johnson et al. | |
| 2009/0016447 A1 | 1/2009 | Chen et al. | |
| 2011/0044164 A1* | 2/2011 | Bennett | H04L 1/1841 |
| | | | 370/221 |
| 2013/0339558 A1 | 12/2013 | Zhu et al. | |
| 2014/0297799 A1* | 10/2014 | Gordon | H04L 67/38 |
| | | | 709/217 |

* cited by examiner

MANAGING A DATA STREAM IN A MULTICORE SYSTEM

BACKGROUND

Today's Wi-Fi systems have multi-core application processors, but typically the Wi-Fi RX (receiver or reception) frames are sent to a single core that runs a Wi-Fi driver. The frames are then indicated to the OS (operating system). To achieve better performance, it is necessary to distribute the Wi-Fi RX frames between the systems cores. Commercially available systems such as Linux support RSS (receive side scaling) for Wi-Fi, where the Wi-Fi NIC (network interface controller) may send frames to multiple cores according to a particular type of hashing over the TCP/IP (transmission control protocol/internet protocol) frame's header. This concept has been used for a long time in fast Ethernet solutions, but for Wi-Fi it is more complex. A difficulty that needs to be addressed in order to get the full benefit of multiple cores processing received frames in parallel, is that the state of the reorder buffers needs to be synchronized, without using OS sync mechanisms such as LOCK.

DETAILED DESCRIPTION

Figure 1:
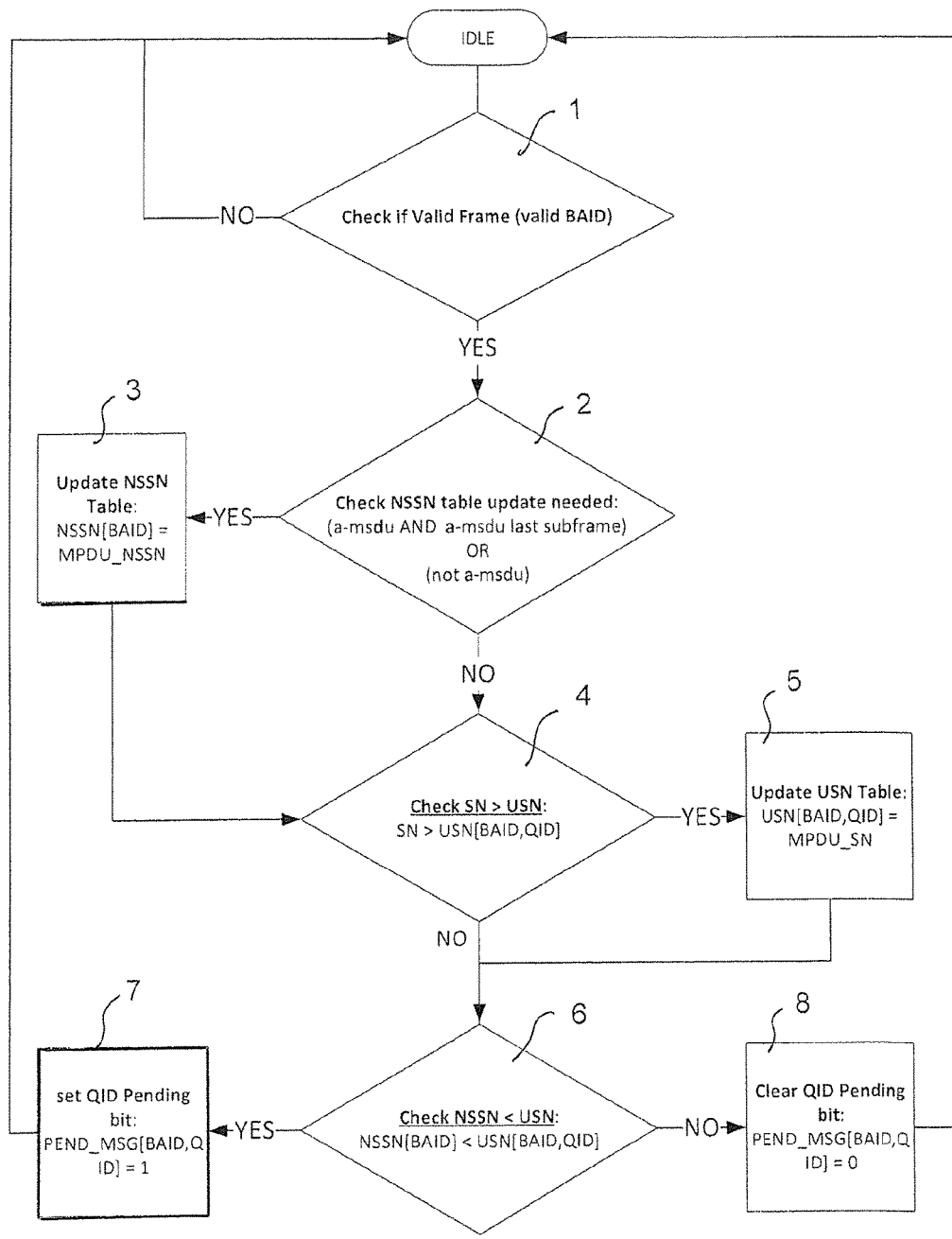
FIG. 1 is a flowchart of an exemplary method according to the present disclosure.

The following abbreviations are used herein:

Array conventions—use of "[N]" to denote element N in array and [N . . . 0]" to denote array of N+1 elements. Use of "[N, M]" to denote element (N,M) in a 2 dimension array, "[N . . . 0, M . . . 0]" denotes 2 dimension array with size N+1 by M+1 elements.

Comparison conventions—use of the term "bigger", "smaller", ">", "<" refers in this document to cyclic compare rather than regular arithmetic compare. For example the SN, SSN, NSSN are all 12-bit values (0x0 . . . 0xfff), so "b>a" means that b is in the range of ((a+1) & 0xfff) ((a+0x800) & 0xfff). For example if a=0x100 then b>a if b is in [0x101 . . . 0x900].

BA—block-acknowledgement (sometimes shortened to block-ack).

BAR—block-acknowledgement request, control frame sent by the BA initiator (transmitter) to the BA recipient (receiver), it carries the SSN for the BA stream. This frame can be used to skip over aborted frames and advance the SSN.

BAID—block-ack ID, as the BA agreement is per SRC_STA/DST_STA/TID tuple, it is classified according to the number of supported BA agreements, for example, in design that supports 32 agreements a BAID is between 0 . . . 31, where 31 is marked by BAID_MAX FREL—frame release logic that is used to sync the relevant system processor cores that a BA window was advanced by sending the NSSN via short notification.

NSSN—normalized start sequence number of the BA window. It equals to the oldest hole in the bitmap or in case there are no holes, it equals to the SN of the last frame received plus 1. For example if the SSN=100 and frames 100 . . . 110, 112 were received, then the NSSN=111.

QID—queue-ID, marks the destination processor core that should process the packet. The QID is set in various ways such as RSS (receive side scaling) which use the UDP/TCP/IP headers to determine the destination core. Received frames under single BAID may be sent to multiple QIDs. The maximal queue-ID is denoted by QID_MAX.

SN—sequence number, a 12-bit number in the mac-header of each packet, it is advanced per STA and TID.

SSN—start sequence number of the BA window. It equals to the SN of the last (newest) frame minus the (BA_WIN_SIZE-1), the SSN may also be changed by the transmitter using special control frame called BAR With the use of a single core reorder buffer, the driver is able to track the reorder buffer advance, and thereby indicate (release) frames to the OS, either when there are no "holes" in the reorder buffer, or the buffer advances due to a new frame that moved the buffer start by SN−(WinSize−1).

With received frames sent to multiple cores, however, there are two bitmap "holes" issues. These are so-called "fake-holes" and "real-holes".

A "fake hole" scenario exists when each core seized the frames sent to the other cores as missing, and thus needs to obtain additional information in order to assist that core in advancing the BA window. Currently, the issue of "fake holes" is addressed by each frame carrying its metadata as a BAID and NSSN. The NSSN marks the SN of the first "hole," and if there are no "holes," it marks the frame after the window end. In a scenario with no reception failures, a frame with SN=N has NSSN=N+1. If, for example, frame N−3 was not received, the NSSN will be N−3. The (BAID, NSSN) pair marks frames to the driver that can be released to the OS from the specified reorder buffer.

The difference between the SSN and the NSSN can be seen from a simple example. In a BA window that starts at SSN=100, bit-n in the bitmap holds the status of frame 100+n, and the window is shifted to SSN=101 only when frame SN=100+WIN_SIZE or bigger is received. If one considers a "hole" in bit-10 of the bitmap (i.e., 1111_1111_1101_. . . ) the SSN is 100 and NSSN is 110. This means that every frame with SN<110 can be released to the OS.

The other scenario of "real holes" are reception failures that should stall the BA window advance but, when a failed frame is finally received, it is sent to a specific core, and thus is not able to report its NSSN to other cores that may be waiting for the NSSN to advance. An example of such a scenario is where frame 101 receives a CRC error:

1. Core=0 gets SN=100/NSSN=101→release to OS
2. Frame SN=101 gets CRC error and is dropped
3. Core-1 gets SN=102/NSSN=101→can't release
4. Core-0 gets SN=101/NSSN=103→release to OS Because there are no frames to core-1, the driver instance running on core-1 cannot release the frame with SN=102 to the OS. Under some conditions, this may cause considerable performance degradation, or even timeouts of upper protocols.

The FREL is responsible for tracking the NSSN sent to each core and, if needed, to send a short (BAID, NSSN) advance message to specific cores.

The FREL receives for each frame (in the frame's metadata) the BAID, QID, SN and NSSN. For each BAID, the FREL tracks the NSSN and for each (BAID, QID) pair, the FREL tracks the USN (upper SN, i.e., the newest frame) sent to the driver instance running on core QID.

The (BAID, QID) stream is marked as MSG_PENDING when the USN[BAID, QID] is bigger than the NSSN [BAID], i.e., the driver instance running on the specific core cannot release the frame. The MSG_PENDING[BAID, QID] state is cleared if a new frame is sent to (BAID, QID) with NSSN[BAID]>USN[BAID, QID]. A frame release notification is sent to a (BAID, QID) stream when the NSSN[BAID] is increased above USN[BAID, QID] due to the received frame for the same BAID being sent to a different QID, after the sending the notification the MSG_PENDING[BAID, QID] is cleared.

Figure 3:
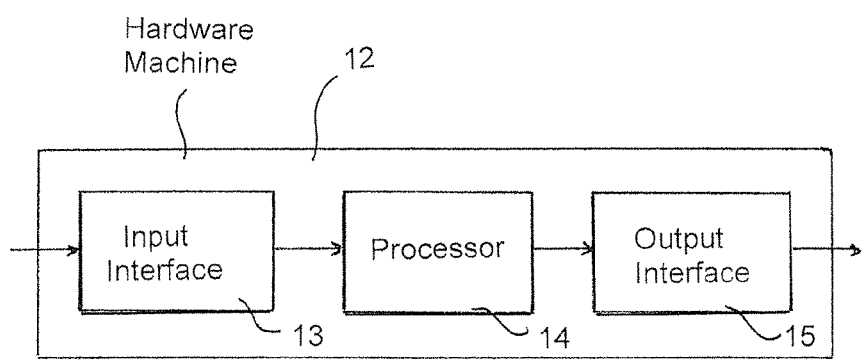
FIG. 3 is a block diagram of a hardware machine according to the present disclosure.

In accordance with the present disclosure, a dedicated hardware machine 12 (as shown in FIG. 3) investigates ("sniffs") the data pipeline with a simple and efficient method, so as to eliminate the scenario of "fake" holes using NSSN, identify when a "real" hole is closed and updating the BAID state of the corresponding cores. This procedure offloads the driver from having to synchronize with other driver instances thus improving performance and reducing power.

By contrast to the solution disclosed herein, the most direct way to address the aforementioned problems would be to maintain a shared data base between all cores, which includes information with respect to all received SN and existing holes. Such a direct solution, however, would require the use of a much more complex code, and in certain scenarios may have an effect on performance, and would be less power efficient, because all of the cores must be active and track the table status when a real hole occurs.

None of these disadvantages exist with the solution disclosed herein.

In accordance with the solution of this disclosure, the NSSN is generated from the SSN by a simple hardware implementation of Find-First-0. This is done in an early stage of the pipeline, as part of the BA handling, and it adds the calculated NSSN to metadata structure, sent with the frame payload.

As noted above, the solution in accordance with this disclosure requires tracking the pipeline and identifying real holes, and cores that did not receive this information. This is accomplished by sniffing the data path and maintaining a database that includes, NSSN[BAID_MAX . . . 0], USN [BAID_MAX . . . 0, QID_MAX . . . 0] (12-bit per element) and MSG_PENDING[BAID_MAX . . . 0, QID_MAX . . . 0] (1-bit per element). Using this information, the hardware can calculate and identify which core has MSG_PENDING, as well as hole release information. The calculation is executed by the method shown in the figure.

Figure 2:
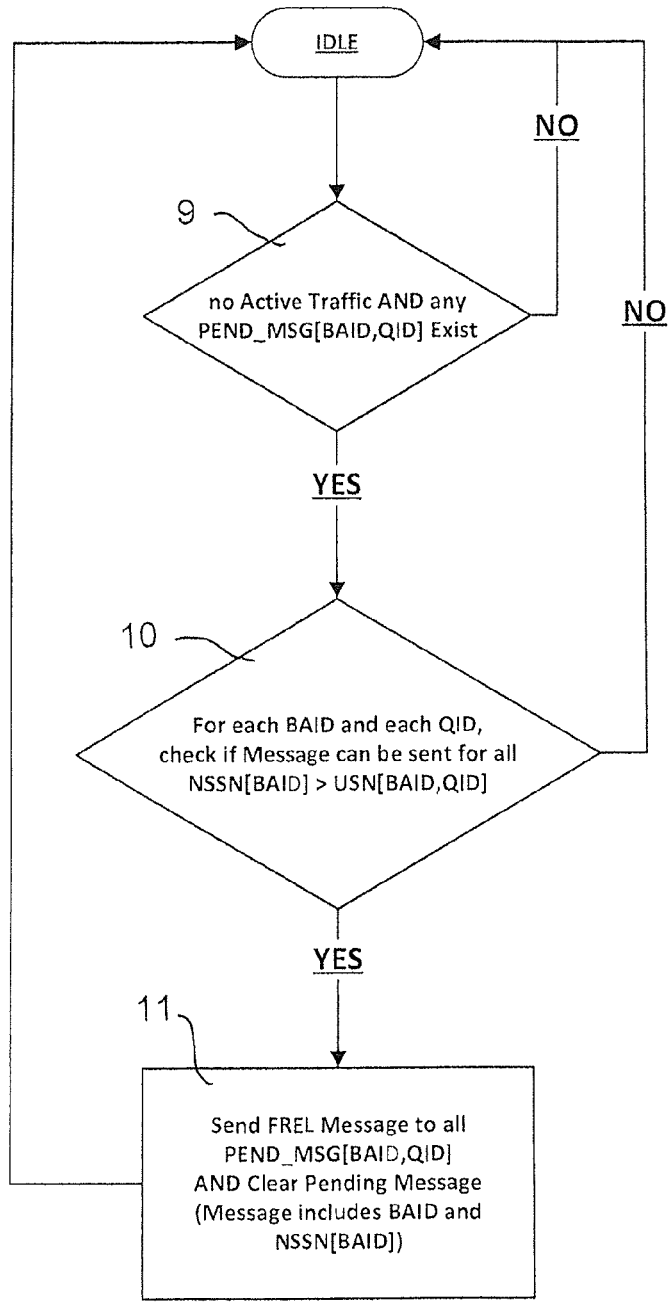
FIG. 2 is a flowchart of a further exemplary method according to the present disclosure.

FIGS. 1 and 2 show a method for sending FREL information for the specific MSG_PENDING core. The hardware will identify when the pipeline is silent, and only then sends a direct notification only to the specific MSG_PENDING core. This is done using the local database collected and calculated from the pipeline. The notification uses the same NSSN method that is done on any other frame.

The FREL method tracks the data path and for each frame with a valid BAID, it uses the following procedure to update the FREL state with the frame's (BAID, QID).

Starting from an IDLE state, the method checks in step 1 whether a valid frame (valid BAID) is present. If NO, the method remains in the IDLE state. If YES, the method proceeds to update the BAID state with the new NSSN and USN information. For this purpose, a check is made in step 2 as to whether NSSN [BAID] should be updated with the received frame's SN, (For Aggregate MAC Service Data Unit (A-MSDU), update should be done only on the last sub-frame). If YES, NSSN is updated in step 3. If NO, a check is made in step 4 as to whether frame's SN>USN [BAID, QID]. If YES, the method updates the USN in step 5. In the second stage, after the updating of the USN and NSSN, the method checks in step 6 whether the current QID should have MSG_PENDING message by checking if the NSSN[BAID]<USN[BAID, QID], If YES, the method sets the MSG_PENDING[BAID, QID] in step 7. If No, the method clears the MSG_PENDING[BAID, QID] in step 8.

As shown in FIG. 2, after this updating the method is IDLE, but upon detecting that in step 9 there is no active receive traffic and that the MSG_PENDING-bit array is not all-0's (OR(MSG_PENDING[BAID_MAX . . . 0, QID_MAX . . . 0]) !=0), the FREL checks in step 10 if it can send a frame release message to any of the cores. This is done by iterating over the BAIDs and QIDs for which there is a MSG_PENDING[BAID, QID] bit set, and checking if NSSN[BAID]>USN[BAID, QID]. If YES, then a frame-release message is sent in step 11 to the QID with the (BAID, NSSN) information and clear MSG_PENDING[BAID, QID], if FALSE no action.

For BAR frame handling, the initiator may send BAR frame to the recipient which advances the BAID SSN. This is handled by first generating the NSSN[BAID] than manipulating the BAR frame's meta-data such it resembles a DATA frame with SN equal to SSN-1 and NSSN calculated after applying the BAR.

A basic block diagram illustrating the components of the hardware machine 12 for implementing the above-described method is shown in FIG. 3. The hardware machine 12 has an input interface 13, at which the aforementioned incoming traffic is received, and the incoming traffic is forwarded to a processor 14 that is configured (programmed) to execute the method illustrated in FIGS. 1 and 2. The FREL message that is thereby generated is emitted from the processor 14 to an output interface 15, from which the FREL message is forwarded to the intended recipient or recipients.

In summary, the procedure in accordance with this disclosure enables processing of multiple core receive packets without the need for driver-based reorder buffer advance sync, and thereby improves throughput at high data rates, particularly when the system contains multiple cores that may be individually relatively weak. The procedure allows better utilization of the multi-core system.

Example 1 is a method for managing forwarding of a data stream to respective cores of a multi-core system, comprising: processing, in a system comprising multiple cores as intended recipients of an incoming data stream, the incoming data stream in a hardware machine prior to forwarding the data stream to respective cores among said multiple cores; identifying, in said hardware machine, frames in said data stream respectively having a fake hole therein and to generate metadata and to attach metadata to any frame in which a fake hole is identified, said metadata instructing a core that receives the respective frame in which a fake hole has been identified to ignore the fake hole in that respective frame; and identifying, in said hardware machine, identifying frames in which a real hole exists and maintaining a database log of said real holes and the respective cores among said multiple cores that receive said data stream with said real holes therein, together with a notification to the respective core.

Example 2 is a method of Example 1 comprising identifying said real holes in respective frames in said data stream by analyzing USN (Upper Sequence Number) and NSSN (Normalized Start Sequence Number) per BAID (Block Acknowledgement Identification).

Example 3 is a method of Example 2 comprising iteratively analyzing USN and NSSN per BAID.

Example 4 is a method of Example 3 comprising iteratively analyzing USN and NSSN per BAID by: maintaining an NSSN table and a USN table; checking said incoming data stream to determine whether a valid frame is present in said incoming data stream; if a valid frame is present in said incoming data stream, checking whether an NSSN table update is needed; if an NSSN table update is needed, updating the NSSN table; and if an NSSN table update is not needed, checking whether SN>USN and, if so, updating the USN table.

Example 5 is a method of Example 4 comprising: if SN is not greater than USN, checking whether NSSN<USN; if NSSN<USN, setting a QID (Queue Identification) pending bit for said valid frame that designates a destination for a message packet in said valid frame; and if NSSN is not less than USN, clearing said QID pending bit.

Example 6 is a method of Example 5 comprising executing said method in said hardware machine based on FREL (Frame Release Logic) information for a MSG_PENDING (Message Pending) core.

Example 7 is a method of Example 4 comprising implementing said check as to whether a valid frame is present in said incoming data stream by checking each frame for a valid BAID.

Example 8 is a method for managing forwarding of a data stream to respective cores of a multi-core system, comprising: in a system comprising multiple cores as intended recipients of an incoming data stream, processing the incoming data stream in a hardware machine prior to forwarding the data stream to respective cores among said multiple cores; analyzing in said hardware machine, FREL (Frame Release Logic) information for a MSG_PENDING (Message Pending) core to identify frames in said data stream respectively having a fake hole therein and to generate metadata and to attach metadata to any frame in which a fake hole is identified, said metadata instructing a core that receives the respective frame in which a fake hole has been identified to ignore the fake hole in that respective frame; and identifying, in said hardware machine, frames in which a real hole exists by analyzing USN (Upper Sequence Number) and NSSN (Normalized Start Sequence Number) per BAID (Block Acknowledgement Identification) and maintaining a database log of said real holes and the respective cores among said multiple cores that receive said data stream with said real holes therein, together with a notification to the respective core.

Example 9 is a method of Example 8 comprising iteratively analyzing USN and NSSN per BAID.

Example 10 is a method of Example 9 comprising iteratively analyzing USN and NSSN per BAID by: maintaining an NSSN table and a USN table; checking said incoming data stream to determine whether a valid frame is present in said incoming data stream; if a valid frame is present in said incoming data stream, checking whether an NSSN table update is needed; if an NSSN table update is needed, updating the NSSN table; and if an NSSN table update is not needed, checking whether SN>USN and, if so, updating the USN table.

Example 11 is a method of Example 10 comprising: if SN is not greater than USN, checking whether NSSN<USN; if NSSN<USN, setting a QID (Queue Identification) pending bit for said valid frame that designates a destination for a message packet in said valid frame; and if NSSN is not less than USN, clearing said QID pending bit.

Example 12 is a method of Example 11 comprising executing said identifying steps in said hardware machine based on FREL (Frame Release Logic) information for a MSG_PENDING (Message Pending) core.

Example 13 is a method of Example 10 comprising implementing said check as to whether a valid frame is present in said incoming data stream by checking each frame for a valid BAID.

Example 14 is a hardware machine for managing forwarding of a data stream to respective cores of a multi-core system, comprising: a processor in a system comprising multiple cores as intended recipients of an incoming data stream configured to process the incoming data stream in a hardware machine prior to forwarding the data stream to respective cores among said multiple cores; said processor being configured to identify frames in said data stream respectively having a fake hole therein and to generate metadata and to attach metadata to any frame in which a fake hole is identified, said metadata instructing a core that receives the respective frame in which a fake hole has been identified to ignore the fake hole in that respective frame; and said processor also being configured to identify frames in which a real hole exists and maintaining a database log of said real holes and the respective cores among said multiple cores that receive said data stream with said real holes therein, together with a notification to the respective core.

Example 15 is a method of Example 14, wherein said processor is configured to identify said real holes in respective frames in said data stream by analyzing USN (Upper Sequence Number) and NSSN (Normalized Start Sequence Number) per BAID (Block Acknowledgement Identification).

Example 16 is a method of Example 15 wherein said processor is configured to iteratively analyze USN and NSN per BAID.

Example 17 is a method of Example 16 wherein said processor is configured to: maintain an NSSN table and a USN table; check said incoming data stream to determine whether a valid frame is present in said incoming data stream; if a valid frame is present in said incoming data stream, check whether an NSSN table update is needed; if an NSSN table update is needed, update the NSSN table; if an NSSN table update is not needed, checking whether SN>USN and, if so, update the USN table.

Example 18 is a method of Example 17 wherein said processor is configured to: if SN is not greater than USN, check whether NSSN<USN; if NSSN<USN, set a QID (Queue Identification) pending bit for said valid frame that designates a destination for a message packet in said valid frame; and if NSSN is not less than USN, clear said QID pending bit.

Example 19 is a method of Example 18 wherein said processor is configured to execute said identifying steps based on FREL (Frame Release Logic) information for a MSG_PENDING (Message Pending) core.

Example 20 is a method of Example 17 wherein said processor is configured to check as to whether a valid frame is present in said data stream by checking for a valid BAID.

Although modifications and changes may be suggested by those skilled in the art, it is the intention of the applicant to embody within the patent warranted hereon all changes and modifications as reasonably and properly come within the scope of the applicant's contribution to the art.

What is claimed:

1. A method for managing forwarding of a data stream to respective cores of a multi-core system, comprising:
   processing, in a system comprising multiple cores as intended recipients of an incoming data stream, the incoming data stream in a hardware machine prior to forwarding the data stream to respective cores among said multiple cores;

identifying, in said hardware machine, frames in said data stream respectively having a fake hole therein and to generate metadata and to attach metadata to each frame in which a fake hole is identified, said metadata instructing a core that receives the respective frame in which a fake hole has been identified to ignore the fake hole in that respective frame;

identifying, in said hardware machine, frames in which a real hole exists and maintaining a database log of said real holes and the respective cores among said multiple cores that receive said data stream with said real holes therein, together with a notification to the respective core; and forwarding, from said hardware machine, the data stream to respective cores among said multiple cores, the data stream including (i) each frame in which a fake hole was identified including the metadata instructing the core receiving each respective frame to ignore the fake hole in that respective frame, and (ii) each frame in which a real hole was identified.

2. A method as claimed in claim 1 comprising identifying said real holes in respective frames in said data stream by analyzing USN (Upper Sequence Number) and NSSN (Normalized Start Sequence Number) per BAID (Block Acknowledgement Identification).

3. A method as claimed in claim 2 comprising iteratively analyzing USN and NSSN per BAID.

4. A method as claimed in claim 3 comprising iteratively analyzing USN and NSSN per BAID by:
maintaining an NSSN table and a USN table;
checking said incoming data stream to determine whether a valid frame is present in said incoming data stream based upon whether a BAID is present in said incoming data stream, a BAID having a value within a range between zero and BAID_MAX, with BAID_MAX being equal to a number of supported BA agreements;
if a valid frame is present in said incoming data stream, checking whether an NSSN table update is needed;
if an NSSN table update is needed, updating the NSSN table; and
if an NSSN table update is not needed, checking whether SN>USN and, if so, updating the USN table.

5. A method as claimed in claim 4 comprising:
if SN is not greater than USN, checking whether NSSN<USN;
if NSSN<USN, setting a QID (Queue Identification) pending bit for said valid frame that designates a destination for a message packet in said valid frame; and
if NSSN is not less than USN, clearing said QID pending bit.

6. A method as claimed in claim 5 comprising executing said method in said hardware machine based on FREL (Frame Release Logic) information for a MSG_PENDING (Message Pending) core.

7. A method as claimed in claim 4 comprising implementing said check as to whether a valid frame is present in said incoming data stream by checking each frame for a BAID.

8. A method for managing forwarding of a data stream to respective cores of a multi-core system, comprising:
in a system comprising multiple cores as intended recipients of an incoming data stream, processing the incoming data stream in a hardware machine prior to forwarding the data stream to respective cores among said multiple cores;
analyzing in said hardware machine, FREL (Frame Release Logic) information for a MSG_PENDING (Message Pending) core to identify frames in said data stream respectively having a fake hole therein and to generate metadata and to attach metadata to each frame in which a fake hole is identified, said metadata instructing a core that receives the respective frame in which a fake hole has been identified to ignore the fake hole in that respective frame;

identifying, in said hardware machine, frames in which a real hole exists by analyzing USN (Upper Sequence Number) and NSSN (Normalized Start Sequence Number) per BAID (Block Acknowledgement Identification) and maintaining a database log of said real holes and the respective cores among said multiple cores that receive said data stream with said real holes therein, together with a notification to the respective core; and forwarding, from said hardware machine, the data stream to respective cores among said multiple cores, the data stream including (i) each frame in which a fake hole was identified including the metadata instructing the core receiving each respective frame to ignore the fake hole in that respective frame, and (ii) each frame in which a real hole was identified.

9. A method as claimed in claim 8 comprising iteratively analyzing USN and NSSN per BAID.

10. A method as claimed in claim 9 comprising iteratively analyzing USN and NSSN per BAID by maintaining an NSSN table and a USN table;
checking said incoming data stream to determine whether a valid frame is present in said incoming data stream based upon whether a BAID is present in said incoming data stream, a BAID having a value within a range between zero and BAID_MAX, with BAID_MAX being equal to a number of supported BA agreements;
if a valid frame is present in said incoming data stream, checking whether an NSSN table update is needed;
if an NSSN table update is needed, updating the NSSN table; and
if an NSSN table update is not needed, checking whether SN>USN and, if so, updating the USN table.

11. A method as claimed in claim 10 comprising:
if SN is not greater than USN, checking whether NSSN<USN;
if NSSN<USN, setting a QID (Queue Identification) pending bit for said valid frame that designates a destination for a message packet in said valid frame; and
if NSSN is not less than USN, clearing said QID pending bit.

12. A method as claimed in claim 11 comprising executing said identifying steps in said hardware machine based on FREL (Frame Release Logic) information for a MSG_PENDING (Message Pending) core.

13. A method as claimed in claim 10 comprising implementing said check as to whether a valid frame is present in said incoming data stream by checking each frame for a BAID.

14. A hardware machine for managing forwarding of a data stream to respective cores of a multi-core system, comprising:
a processor in a system comprising multiple cores as intended recipients of an incoming data stream, the processor configured to:
process the incoming data stream in a hardware machine prior to forwarding the data stream to respective cores among said multiple cores;
identify frames in said data stream respectively having a fake hole therein and to generate metadata and to attach metadata to each frame in which a fake hole is identified, said metadata instructing a core that receives the respective frame in which a fake hole has been identified to ignore the fake hole in that respective frame; and identify frames in which a real hole exists and maintaining a database log of said real holes and the respective cores among said multiple cores that receive said data stream with said real holes therein, together with a notification to the respective core; and an output interface configured to forward the data stream to respective cores among said multiple cores, the data stream including (i) each frame in which a fake hole was identified including the metadata instructing the core receiving each respective frame to ignore the fake hole in that respective frame, and (ii) each frame in which a real hole was identified.

15. A hardware machine as claimed in claim 14, wherein said processor is configured to identify said real holes in respective frames in said data stream by analyzing USN (Upper Sequence Number) and NSSN (Normalized Start Sequence Number) per BAID (Block Acknowledgement Identification).

16. A hardware machine as claimed in claim 15 wherein said processor is configured to iteratively analyze USN and NSN per BAID.

17. A hardware machine as claimed in claim 16 wherein said processor is configured to:

maintain an NSSN table and a USN table;

check said incoming data stream to determine whether a valid frame is present in said incoming data stream based upon whether a BAID is present in said incoming data stream, a BAID having a value within a range between zero and BAID_MAX, with BAID_MAX being equal to a number of supported BA agreements;

if a valid frame is present in said incoming data stream, check whether an NSSN table update is needed;

if an NSSN table update is needed, update the NSSN table;

if an NSSN table update is not needed, checking whether SN>USN and, if so, update the USN table.

18. A hardware machine as claimed in claim 17 wherein said processor is configured to:

if SN is not greater than USN, check whether NSSN<USN;

if NSSN<USN, set a QID (Queue Identification) pending bit for said valid frame that designates a destination for a message packet in said valid frame; and if NSSN is not less than USN, clear said QID pending bit.

19. A hardware machine as claimed in claim 18 wherein said processor is configured to execute said identifying steps based on FREL (Frame Release Logic) information for a MSG_PENDING (Message Pending) core.

20. A hardware machine as claimed in claim 17 wherein said processor is configured to check as to whether a valid frame is present in said data stream by checking for a BAID.

* * * * *